(12) United States Patent
Hertler et al.

(10) Patent No.: US 12,140,919 B2
(45) Date of Patent: Nov. 12, 2024

(54) CONTROL FOR USE IN AN AUTOMATION SYSTEM

(71) Applicant: Festo SE & Co. KG, Esslingen (DE)

(72) Inventors: Frederik Hertler, Esslingen (DE); Jan Reimer, Esslingen (DE); Armin Hartmann, Ostfildern (DE)

(73) Assignee: Festo SE & Co. KG, Esslingen (DE)

( * ) Notice: Subject to any disclaimer, the term of this patent is extended or adjusted under 35 U.S.C. 154(b) by 368 days.

(21) Appl. No.: 17/529,616

(22) Filed: Nov. 18, 2021

(65) Prior Publication Data

US 2022/0155740 A1    May 19, 2022

(30) Foreign Application Priority Data

Nov. 19, 2020    (DE) .......................... 102020214573.3

(51) Int. Cl.
*H04L 67/12* (2022.01)
*G05B 19/042* (2006.01)

(52) U.S. Cl.
CPC ............ *G05B 19/042* (2013.01); *H04L 67/12* (2013.01); *G05B 2219/2642* (2013.01)

(58) Field of Classification Search
CPC ... H04L 67/12; G05B 19/042; G05B 19/0423; G05B 2219/2642
See application file for complete search history.

(56) References Cited

U.S. PATENT DOCUMENTS

| | | | | |
|---|---|---|---|---|
| 5,790,965 | A | * | 8/1998 | Abe ...................... G01M 15/05 701/34.2 |
| 11,091,169 | B2 | * | 8/2021 | Druml ................... G01S 7/4052 |
| 2001/0025349 | A1 | * | 9/2001 | Sharood ............ G06Q 30/0236 713/340 |
| 2019/0199685 | A1 | * | 6/2019 | Lu ....................... H04L 12/2838 |

FOREIGN PATENT DOCUMENTS

| | | |
|---|---|---|
| DE | 102011006590 A1 | 5/2012 |
| DE | 102014107689 A1 | 12/2014 |
| EP | 1349024 A2 | 10/2003 |

* cited by examiner

*Primary Examiner* — Rasheed Gidado
(74) *Attorney, Agent, or Firm* — Hoffmann & Baron, LLP

(57) ABSTRACT

Control for use in an automation system, including a processor having a communication port for a communication with a sensor and for a reception of sensor signals and a control port for providing control signals, a supply connected to the control port and adapted to provide a variable electrical supply voltage at a supply port in dependence on a control signal level of the control signal, wherein the communication port, the communication port and the supply port are connected to an interface adapted for electrical connection to a sensor, wherein the processor is adapted for providing at least two different communication protocols at the communication port and for providing at least two different control signal levels at the control port.

10 Claims, 3 Drawing Sheets

CONTROL FOR USE IN AN AUTOMATION SYSTEM

BACKGROUND OF THE INVENTION

The invention relates to a control for use in an automation system and to a method for establishing communication between a processor and a sensor forming a control.

Such a control may be used as a servo drive controller for the closed-loop control of an electric motor. By way of example, it is provided that the control converts movement commands provided by a higher-level controller, in particular a programmable logic controller (PLC), into electrical energy for an electric motor, resulting in a movement of the electric motor. The control is designed for communication with at least one sensor associated with the electric motor in order to be able to form a closed feedback loop for controlling the operation of the electric motor on the basis of the sensor signals of the at least one sensor (closed loop operation).

In a known control it is provided that, before the control is put into operation, a processor associated with the control must be parameterized to a sensor, which is connected to the processor in order to ensure proper communication between the sensor and the processor. For example a user must first determine which type of sensor is connected to the processor and then, using a parameterization device, for example a computer, provide to the processor a set of parameters which are required to operate the corresponding sensor, the parameters may be stored in an external database.

SUMMARY OF THE INVENTION

The task of the invention is to provide a control and a method for establishing a communication between a processor of a control and a sensor, which ensure simplified commissioning of the control.

This task is solved for a control of the type mentioned above in that the control comprises a processor which comprises a communication port for a communication with a sensor and for a reception of sensor signals and further comprises a control port for providing control signals, wherein the control comprises a supply which is connected to the control port and which is used to provide a variable electrical supply voltage, in particular at least two non-zero supply voltage levels, at a supply port as a function of a control signal level of the control signal, the communication port and the supply port being connected to an interface which is designed for electrical connection to a sensor, and in that the processor is configured for providing at least two different communication protocols at the communication port and for providing at least two different control signal levels at the control port. The term control signal level is to be understood as a state of a control signal that can be distinguished from other states. If the control signal is, for example, an analog voltage, the control signal level is to be understood as the absolute value of this voltage. If the control signal is a digital signal, for example, the control signal level means the value represented by the digital signal.

The processor is preferably a microcontroller or microprocessor that runs a computer program that can detect and process the sensor signal from the sensor connected to the processor.

The sensor is used to detect a physical quantity, for example from the group: rotational speed, acceleration, sound pressure, temperature, and to convert it into an electrical sensor signal. The sensor signal can be an analog sensor signal, a digital sensor signal or a combination of an analog and a digital sensor signal. The sensor signal is provided by the sensor at an interface of the automation system and is forwarded from there to an input port of the processor.

The processor is configured for an alternative communication with at least two different sensors and must therefore be able to provide at least two different communication protocols at a communication port which is configured for communication with the sensor and which is electrically connected to the interface. In this context, it is assumed that the processor is configured to communicate with a first sensor by an appropriate first parameterization and is able to communicate alternatively with a second sensor, which requires a different parameterization by using a second parameterization. In particular, the processor can be configured to address a plurality of differently configured sensors, which are connected to different interfaces of the processor, while using communication protocols which are provided during a suitable parameterization of the processor, to process their respective sensor signals.

The different communication protocols can be, for example, analog signals or signal sequences thereof or digital signals or signal sequences thereof which are adapted to the respective sensor which is connected to the interface of the processor. The use of the correct communication protocol together with a suitable supply voltage, which is provided to the sensor by the processor, with the interposition of the supply between the processor and the sensor, result in the sensor signal provided by the connected sensor.

Depending on the required communication protocol, communication between the processor and the sensor can be effected by means of a permanently provided electrical signal with a temporally constant or temporally variable signal level from the processor and thus output as an analog or digital signal sequence.

For the communication with the sensor the communication protocol may be chosen from the group: EnDat22; EnDat21; Nikon A format; Hiperface; Incremental and/or further communication protocols can be used. For each of the communication protocols, a supply voltage or supply voltage interval is typically defined with which the sensor must be supplied for communication with the processor. Accordingly, exactly the supply voltage as defined by the respective communication protocol or a freely selectable voltage from the supply voltage interval as defined by the respective communication protocol must be provided to ensure proper communication between the processor and the sensor. Thus, it can be assumed that a sensor configured for a predetermined communication protocol as well as for a predetermined supply voltage will only output a sensor signal if both the communication with the processor via the predetermined communication protocol and a supply of the sensor with the predetermined supply voltage or within the predetermined supply voltage interval is ensured.

Preferably, the processor is provided with a combined output and input port, referred to as a communication port, at which either communication signals for the sensor are provided or incoming sensor signals can be processed in a suitable time sequence. Alternatively, an output port for communication with the sensor, which may also be referred to as a first communication port, and an input port for receiving sensor signals, which may also be referred to as a second communication port, are formed as discrete ports on the processor.

The supply may be, for example, an adjustable voltage regulator connected to an electrical power source which is located aside of the control and which, in response to a control signal from the processor provided at a control port of the processor, provides electrical power to be supplied to the sensor via the interface at the appropriate supply voltage. The supply may be in the form of a discrete electronic component arranged on a printed circuit (printed circuit board, flex conductor) together with the processor. Alternatively, the supply can be integrated as a circuit arrangement in the processor, which is typically configured as an integrated circuit in the form of a microprocessor or microcontroller. Purely by way of example, it is provided that the supply is configured to provide the electrical supply voltage at the supply port in a proportional dependence on a control signal level of the control signal. In particular, it is provided that the at least two different control signal levels provided by the processor have different signal levels (absolute values) and that a lower signal level results in a provision of a lower supply voltage compared to a supply voltage output at a higher signal level. Thereby, the processor provides at least two different control signal levels which are defined in such way that the electrical supply voltage at the supply port provided by the supply always has an absolute value greater than zero during the provision of the at least two different communication protocols.

Advantageous further embodiments of the invention are the subject of the subclaims.

It is advantageous if the processor has a power output and if an electrical output stage, which is connected to the power output and to the interface is configured to provide electrical power to the interface as a function of a power signal which is provided at the power output. The electrical output stage is adapted to output electrical energy provided by an electrical power source to the interface in response to the power signal that may be provided by the processor at the power output. Accordingly, an electrical consumer may be connected to the interface in addition to the sensor, the electrical consumer having an electrical power consumption that is substantially higher than the power consumption of the sensor. Exemplarily, it is provided that the electrical consumer is an actuator, in particular an electric motor. The electrical consumer or actuator is supplied with electrical energy by means of the control using the sensor signals of the sensor in a controlled operation (closed loop) in order to provide a movement which can be used, for example, to carry out or support a work sequence in a processing machine and which movement is specified, in particular, by a movement command of a higher-level control.

According to a further embodiment of the invention, it is provided that a sensor is connected to the interface, which sensor is configured for communication with the processor in accordance with a predetermined communication protocol and at a predetermined electrical supply voltage, and that an electrical consumer is connected to the interface, which electrical consumer is connected to the electrical output stage, wherein the sensor is configured for a detection of a physical variable of the electrical consumer, and wherein the electrical consumer is configured for providing a movement.

The control is, for example, a servo drive controller or a motor controller as used for providing electrical energy to an electric motor in an automation system.

Preferably the electrical energy is provided in response to a sensor signal from a sensor, and the control operates with a control algorithm for this provision of electrical energy, which control algorithm is preferably a part of the computer program running on the processor, and which control algorithm is used to perform processing of the sensor signal from the sensor and to provide electrical energy to the electrical consumer in accordance with the sensor signal.

For an operation of the electrical consumer it is necessary to establish in a first step a communication between the processor and the sensor, which is associated with the electrical consumer. As soon as this communication link is established, the processor can use the sensor signal provided by the sensor and further can use a fixed movement command or a time-variable movement command, which can be provided in particular by a higher-level controller or which results from a sequence of movement commands stored in the processor, to determine a deviation between a setpoint which is specified by the movement command and the actual value which is determined on the basis of the sensor signal for the operation of the electrical consumer. Based on this deviation, an output of the power signal can then be made at the power output of the processor. This provision of the power signal enables the output stage of the control to provide electrical power to the interface to operate the electrical consumer can be operated. By way of example, the electrical output stage comprises one or more semiconductor components which are configured to release electrical energy from an, in particular external, energy source as a function of the power signal and to provide it to the interface.

Depending on the type of electrical consumer, which may be, for example, a synchronous motor or an asynchronous motor, the electrical output stage is configured to supply a DC voltage or one or more AC voltages at the interface. Accordingly, the electrical output stage may comprise one or more driver circuits which are configured to release the respective amount of electrical energy required.

The provision of electrical energy to the electrical consumer may, for example, cause a change in a state of motion for the electrical consumer, which in turn results in a change in the sensor signal from the sensor, thereby closing the desired control loop in the processor.

Preferably, the processor is configured for a communication setup with a sensor for sequentially performing a first communication cycle and after the first communication cycle a second communication cycle, wherein the first communication cycle comprises providing a first communication protocol sequence at a first control signal level, wherein the second communication cycle comprises providing a second communication protocol sequence at a second control signal level, and wherein the second control signal level is selected such that an absolute value of the supply voltage is higher than at the first control signal level.

This embodiment of the processor, which can be realized with a computer program which is running on the processor, enables an automated recognition of a sensor connected to the interface and thus a start-up of the control. As a result the control according to the invention allows a start up with a new sensor without the influence of an operator.

For the establishment of the communication link between the processor and the sensor, it is provided that the processor provides different communication protocols to the sensor at a first supply voltage and subsequently at at least a second supply voltage until either all communication protocols and all supply voltages have been provided and no sensor signal has been received or until a sensor signal is received at a specific combination of a communication protocol and a supply voltage.

Here, it is assumed that certain communication protocols can already result in a sensor signal when the first supply voltage is provided, as far as the sensor is configured for communication via one of these communication protocols. Accordingly, those communication protocols which are provided for a communication with the sensor at the first supply voltage are combined in a first communication cycle. Exemplarily, the first communication cycle is structured in such a way that the different communication protocols are provided in a fixed sequence and with a fixed time interval between them at the communication port of the processor.

Preferably, the different communication protocols of the first communication cycle are arranged in a temporal sequence such that those communication protocols that are more likely to lead to a communication with the sensor are arranged temporally upstream (earlier in the temporal sequence) of those communication protocols within the first communication cycle that are less likely to lead to a communication with the sensor.

Alternatively, it can be provided that the different communication protocols of the first communication cycle are arranged in sequence depending on the individual duration with which the communication capability with the sensor can be checked for the respective communication protocol. By way of example those communication protocols with which a rapid check of the communication capability with the sensor is ensured are preceded in time by those communication protocols which result in a slower check of the communication capability. Similarly, the communication protocols that are to be tested at the second supply voltage form the second communication cycle and are arranged within the second communication cycle for this purpose.

If necessary, a communication protocol that is already included in the first communication cycle can also be included in the second communication cycle, thus the communication capability of the sensor with the processor can be tested within the scope of this communication protocol at two different supply voltages.

Here, the second control signal level is selected to be higher than the first control signal level. This may mean that an amount, such as an electrical voltage or current, of the first control signal level is less than an amount of the second control signal level. The may also mean that the first control signal level is digitally encoded and results in the provision of a lower supply voltage by the supply than is the case for the second control signal level.

In a further embodiment of the invention, it is provided that the processor is configured to terminate the execution of the respective communication cycle when a sensor signal arrives at the communication port and to retain the communication protocol and the control signal level with which the sensor signal was triggered. By this measure, the combination between the communication protocol and the control signal level is retained for further communication between the processor and the sensor, with which communication of the sensor with the processor can take place.

Advantageously, the processor is adapted for providing a read signal for reading an electronic nameplate of the sensor to the communication port and for adapting a processing of the sensor signals in response to information as stored in the electronic nameplate. The electronic nameplate is used to read sensor-specific information, in particular parameters, from the sensor and to make it available to the processor, so that an advantageous adaptation of the communication between the processor and the sensor can be carried out. Exemplarily, it is provided that the electronic nameplate, in addition to an individual identification number and/or a type designation of the sensor, also contains communication information and/or communication parameters that can be used for a specific adaptation of the determined communication protocol to the sensor. For example, the electronic nameplate can contain one or more parameters that can be used to parameterize the communication protocol to the specific requirements of the sensor in order to ensure particularly advantageous communication between the sensor and the processor.

Preferably, it is provided that the processor is configured for carrying out a control algorithm with which the power signal can be varied as a function of the sensor signal or as a function of the sensor signal and a power demand, in particular a power demand that varies with time. In this case, the power demand can be specified by the computer program running on the processor or on the basis of an external movement command, which can be provided by a higher-level controller and can be converted into a corresponding power output of the electrical consumer with the aid of the control algorithm and the sensor signals of the sensor.

According to a further embodiment of the invention, it is provided that the processor comprises a measurement port which is connected to the interface and that the processor is configured for an evaluation of a measurement signal level provided at the measurement port. The measurement port can be used to check whether the supply voltage provided by the processor at the interface actually arrives at the sensor or whether there is an impairment of the electrical supply to the sensor due to external influences such as, for example, a poor electrical contact and/or a long line length between the interface of the processor and the sensor.

According to a second aspect of the invention a method for establishing communication between a processor and a sensor forming a control is provided. Here, the processor is adapted for processing sensor signals of the sensor and the sensor connected to the processor is adapted for detecting a physical quantity and for providing a sensor signal which is dependent on the detected physical quantity. In this regard, the sensor is adapted to communicate with the processor in accordance with a predetermined communication protocol upon provision of a predetermined supply voltage from the processor. The method comprises the steps of: sequentially performing a first communication cycle comprising providing a first communication protocol sequence at a first control signal level, and a second communication cycle comprising providing a second communication protocol sequence at a second control signal level, wherein the supply voltage is higher when the second control signal level is provided than when the first control signal level is provided, and wherein termination of the respective communication cycle occurs when a sensor signal is provided by the sensor.

Each of the communication protocol sequences may include one or more communication protocols. The first control signal level and the second control signal level are configured such that a first supply voltage provided by the supply, which is determined by the first control signal level, has a lower potential difference than a second supply voltage, which is determined by the second control signal level.

According to a further embodiment of the method, it is provided that in the first communication protocol sequence a plurality of communication protocols, in particular exclusively those communication protocols, are provided which are configured for communication with the sensor when a first electrical supply voltage is present, and it is provided that in the second communication protocol sequence a plurality of communication protocols, in particular exclusively those communication protocols, are provided which are configured for communication with the sensor when a second electrical supply voltage is present.

BRIEF DESCRIPTION OF THE DRAWINGS

An advantageous embodiment of the invention is shown in the drawing. Here shows.

DETAILED DESCRIPTION

Figure 1:
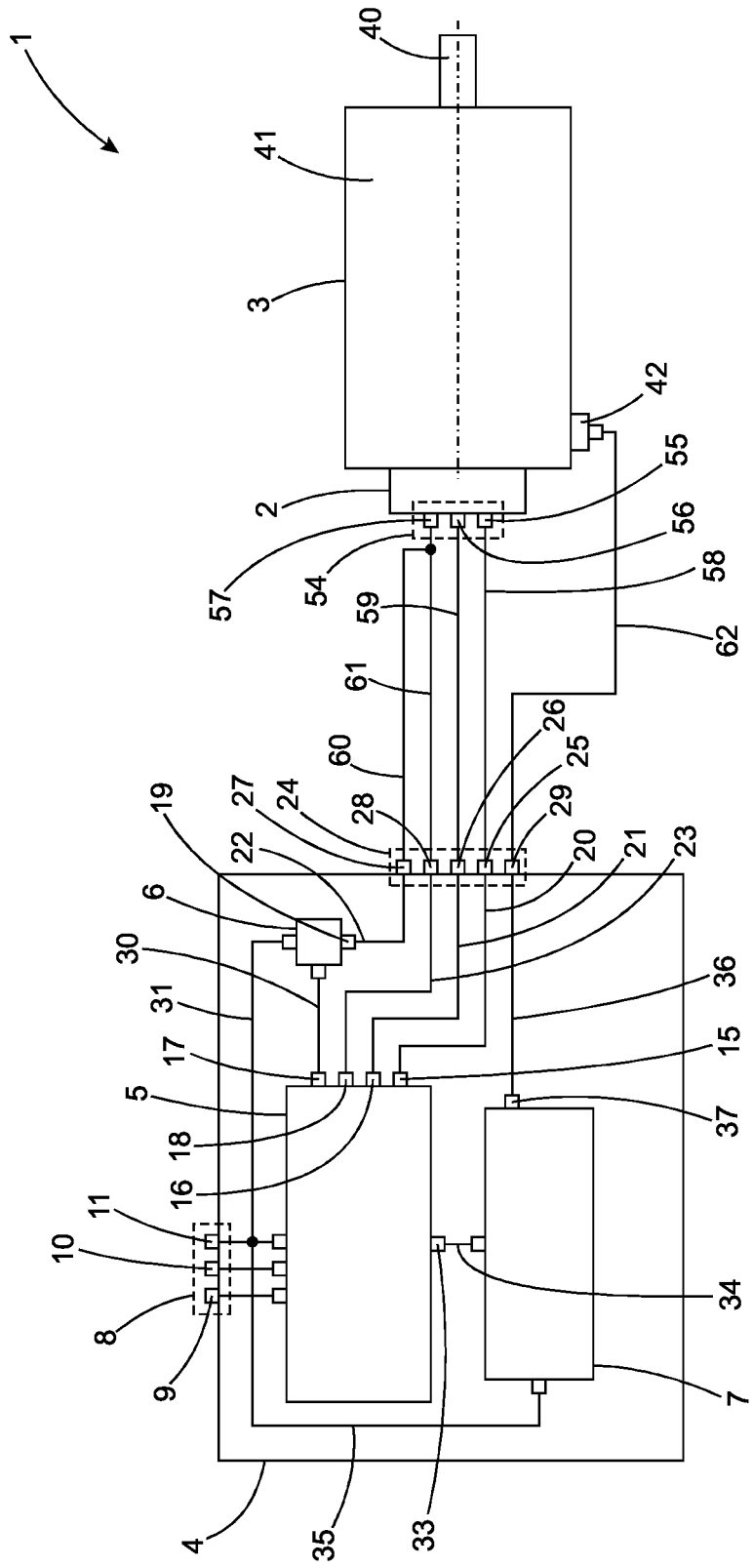
FIG. 1 a strictly schematic representation of a control,
FIG. 2 a flow chart illustrating a method for establishing communication between a processor and a sensor, and
FIG. 3 a schematic representation of two communication protocol sequences.

A control 1 shown purely schematically in FIG. 1 is configured for use in an automation system (not shown). The automation system can be, for example, a machine tools for machining workpieces or a processing machine for carrying out a process.

The control 1 comprises a sensor 2 and an electrical consumer, which is an electrical drive motor 3 and further comprises a control unit 4.

The sensor 2 is designed to detect a physical quantity, such as an angle of rotation of a drive shaft 40 of the drive motor 3 relative to a motor housing 41 of the drive 3, and to provide an electrical sensor signal representing the absolute value of the detected physical quantity.

The drive motor 3 is a synchronous motor and, when suitably controlled by the control unit 4, provides a rotational movement at the drive shaft 40, which is rotatably mounted in the motor housing 41. For example the drive motor 3 is used to drive a component such as a gear wheel or a fan wheel of the automation system (not shown).

The control unit 4 has a processor 5, a supply 6 and an electrical output stage 7. The control unit 4 is equipped with a terminal strip 8, which serves to electrically connect the control unit 4 to components of the automation system (not shown), such as a higher-level controller which is configured as a programmable logic controller and an electrical voltage source. The terminal strip 8 comprises a communication connection 9 which is configured for communication with the higher-level controller, for example via a field bus protocol. Furthermore, the terminal strip 8 comprises a ground connection 10 and a voltage connection 11, both of which are configured for electrically coupling the control unit 4 to the electrical voltage source, which is not shown.

As can be seen from FIG. 1, the communication port 9, the ground terminal 10 and the voltage terminal 11 are electrically connected to the processor 5, wherein the processor 5 is exemplarily designed as a computer, in particular as a microprocessor, and is configured for processing a computer program, which is stored in a fixed or variable manner in the processor 5.

The processor 5 is configured for electrically driving the sensor 2 and for processing an electrical sensor signal which is provided by the sensor 2 as a function of a physical variable detected by the sensor 2. For the control of the sensor 2, the provision of an electrical supply voltage, which is provided in particular via the terminal strip 8 to the control 1, is required. For the control of the sensor 2, it is further necessary to establish a communication link between the control 1 and the sensor 2. For a communication between the control 1 and the sensor 2, a combination of a correctly selected electrical supply voltage and a correctly selected communication protocol specified by the sensor 2 is required.

For control and communication with the sensor 2, the processor 5 comprises an output port 15 for communication with the sensor 2, an input port 16 for receiving sensor signals from the sensor 2, and a control port 17 for providing control signals. Furthermore, the processor 5 comprises a measurement port 18, which is configured to detect an electrical voltage level and which can be used, for example, to check whether an electrical voltage provided by the control unit 4 to the sensor 2 is actually transmitted to the sensor 2 via an assigned line.

According to an alternative embodiment of the control 1, the input port 16, the associated input line 21, the input terminal 26, the second connection line and the second terminal 56 are omitted. In this case, the output port 15 serves as a bidirectional communication port and bidirectional communication between the processor 5 and the sensor 2 is performed via the assigned output line 20, the output terminal 25, the first connection line 58 and the first terminal 55. Since this alternative embodiment of the control 1 does not have any further differences compared with the control 1 as shown in FIG. 1, there is no separate diagrammatic representation of this embodiment.

The supply 6 is configured, for example, as an adjustable voltage regulator and is electrically connected to the control port 17 via a control line 30 and is connected to the voltage terminal 11 of the terminal strip 8 via a supply line 31. The supply 6 is configured in such a way that, depending on an electrical control signal provided at the control port 17, it can provide a corresponding supply voltage at a supply port 19, which is electrically connected to a supply port 27 of an interface 24 via a supply line 22. Exemplarily, the interface 24 is in the form of a multiple connector and is arranged externally on the control unit 4. The interface 24 further comprises an output terminal 25, which is connected to the output port 15 via an output line 20, as well as an input terminal 26, which is connected to the input port 16 via an input line 21, and a measurement port 28, which is connected to the measurement port 18 via a measuring line 23.

Purely by way of example, the electrical output stage 7 which is integrated in the control unit 4 is connected to a power output 33 of the processor 5 via a signal line 34. Furthermore, the electrical output stage 7 is connected to the voltage connection 11 of the terminal strip 8 via a supply line 35. The electrical output stage 7 is configured to provide electrical energy to a power terminal 29, which is integrated in the interface 24, as a function of a power signal provided by the processor 5 at the power output 33 via the signal line 34. Here, it is provided that the power terminal 29 is connected to a power stage terminal 37 of the electrical power stage 7 via a power line 36. The power terminal 29 is connected to a consumer port 42 via a fifth connection line 62.

In this connection, it should be mentioned that the connections, lines and terminals described above may each include one or more electrical lines, but these are not shown for clarity. The power terminal 29 comprises a plurality of individual connections which are connected to the electrical output stage 7 via individual lines of the power line (which are not shown) and via which a plurality of alternating electrical currents to the drive motor 3 is provided.

The sensor 2 comprises a sensor interface 54 which comprises a first terminal 55, a second terminal 56 and a third terminal 57. By way of example, it is provided that the first terminal 55 is configured to receive signals and is electrically connected to the output terminal 25 via a first connection line 58. Further, the second terminal 56 is configured to provide sensor signals and is electrically connected to the input terminal 26 via a second connection line 59. The third terminal 57 is configured to supply electrical power to the sensor 2 and is electrically connected to the supply port 27 via a third connection line 60. In order to check the electrical supply between the supply port 27 and the third terminal 57 of the sensor 2, a fourth connection line 61 is provided, which extends from the measurement port 28 to just before the third terminal 57 and is electrically connected there to the third connection line 60. Via this fourth connection line 61, which can also be referred to as a measuring line, the processor 5 is enabled to determine a voltage level in the third connection line 60 immediately before the third terminal 57.

The processor 5 is adapted for establishing a communication with the sensor 2 by sequentially providing at least two different communication protocols at the output terminal 15, and by sequentially providing at least two different control signal levels at the control port 17. This enables an automated execution of the communication setup between the processor 5 and the sensor 2.

For this automated communication setup the processor 5 provides in a first step at least one communication protocol, which is configured for this first, low control signal level at the output connection 15 and thus also at the output terminal 25. Due to the provision of the first, low control signal level to the supply 6, the supply provides a first, low supply voltage at the supply port 27. Provided that the sensor 2 is adapted to communicate with the first communication protocol provided by the processor 5 at the first, low supply voltage also provided by the processor 5 with the interposition of the supply 6, the sensor 2 may provide a sensor signal at the input terminal 26 which is provided to the input port 16 via the input line 21.

If the sensor 2 is not configured to communicate with the first communication protocol at the first supply voltage, provision may be made for the processor 5 to provide a second communication protocol at the output terminal 25 without changing the first, low supply voltage. The provision of at least one communication protocol, in particular multiple communication protocols, at the first, low supply voltage is also referred to as a first communication protocol sequence. The combination of the first communication protocol sequence with the first, low supply voltage is also referred to as a first communication cycle.

Provided that the first communication protocol sequence comprises exactly one communication protocol and this has not led to the detection of a sensor signal of the sensor 2, it is further provided that, in the case of a second, higher control signal level, the processor 5 carries out a provision of at least one communication protocol designed for this second, higher control signal level at the output terminal 15 and thus also at the output terminal 25. Due to the provision of the second, higher control signal level to the supply 6, the latter provides a second, higher supply voltage at the supply port 27. Provided that the sensor 2 is adapted to communicate with the first communication protocol provided by the processor 5 at the second, higher supply voltage also provided by the processor 5 (with the interposition of the supply 6) the sensor 2 may provide a sensor signal at the input terminal 26 which is provided to the input port 16 via the input line 21.

On the other hand, if the sensor 2 is not adapted to communicate with the first communication protocol at the second supply voltage, provision may be made for the processor 5 to provide a second communication protocol at the output terminal 25 without changing the second, higher supply voltage. The provision of at least one communication protocol, in particular a plurality of communication protocols, by the processor 5 at the second, higher supply voltage is also referred to as a second communication protocol sequence. The combination of the second communication protocol sequence with the second, higher supply voltage is also referred to as a second communication cycle.

Here, the first communication protocol provided by the processor 5 in combination with the first, lower supply voltage may either be identical to the first communication protocol provided by the processor 5 in combination with the second, higher supply voltage, or different from this first communication protocol at the second, higher supply voltage.

The timing of the communication protocols provided by the supply 5 in the respective communication protocol sequence may be made according to different criteria. By way of example, it may be provided that within the communication protocol sequence those communication protocols are arranged first which are more likely to enable communication with the sensor 2. Alternatively, it can be provided that those communication protocols are arranged first within the communication protocol sequence that lead particularly quickly to a signal response from the sensor 2.

In order to ensure an unambiguous assignment between the respective communication cycle and an incoming sensor signal of the sensor 2, it is preferably provided that after completion of a preceding communication cycle and before execution of the subsequent communication cycle, a complete disconnection of the supply voltage is performed. Supplementary or alternatively, it can be provided that a complete disconnection of the supply voltage is also carried out between the provision of individual communication protocols during the execution of a communication cycle, in particular in order to effect a reset of the sensor 2 in the event that the sensor has been placed in an undefined state by a supply voltage level that is unsuitable for it and/or a communication protocol that is unsuitable for it.

Figure 2:
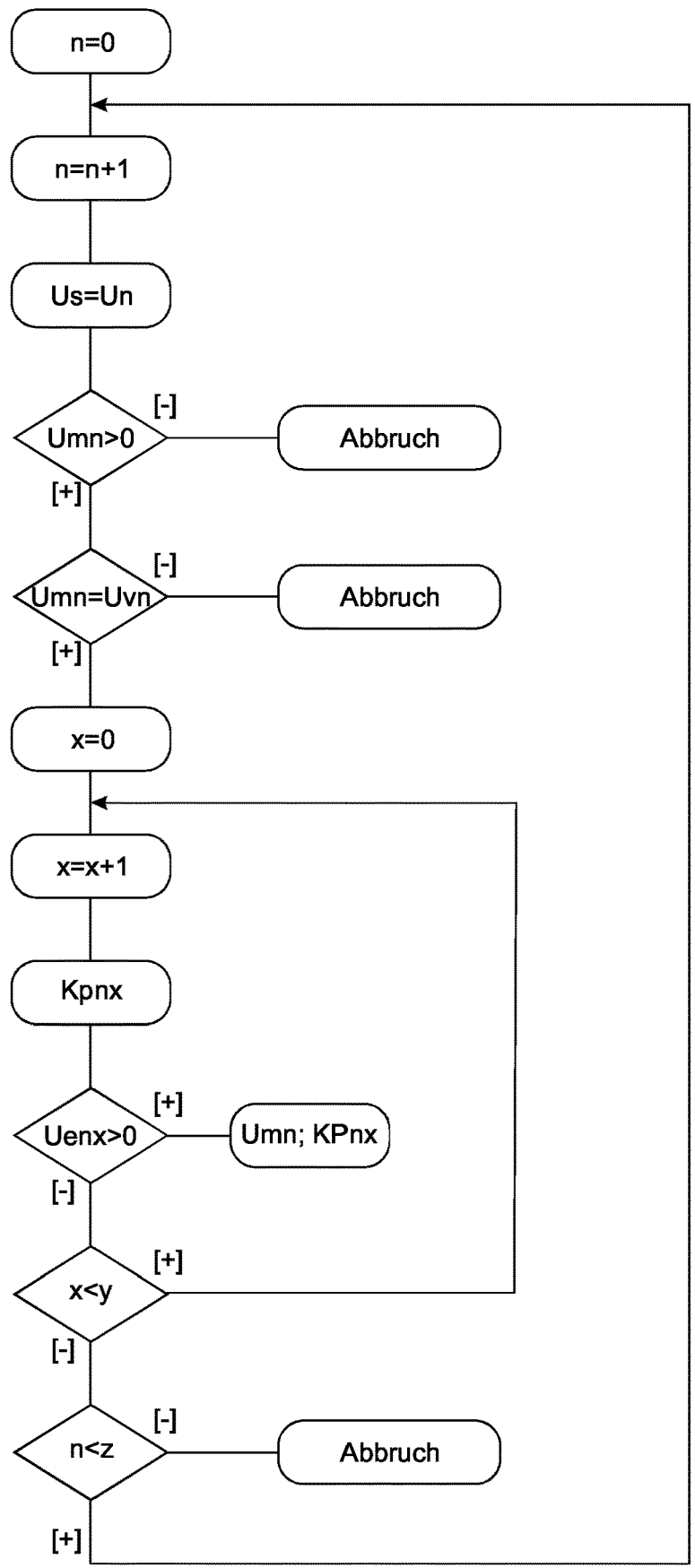

FIG. 2 shows a flow diagram in which a method for establishing communication between the processor 5 and the sensor 2 is shown purely schematically, this method being implemented as a computer program in the processor 5.

At the beginning of the communication setup, in a first step a counter "n" for the number of communication cycles to be provided by the processor 5 is set to the value 0. In a subsequent step, the amount 1 is added to the counter "n" so that its amount is now 1. Subsequently, using the counter "n", a control signal level Us to be provided by the processor 5 is equated with a predetermined control voltage U1, in particular stored in the processor 5. The processor 5 provides the control voltage Us=U1 to the supply 6, which provides a supply voltage Uv1 corresponding to the control voltage Us=U1 at the supply port 27 as shown in FIG. 1.

In a subsequent step, the processor 5 checks whether a predetermined electrical voltage level Um1 is present at the measurement port 18. This voltage level Um1 is tapped directly before the third terminal 57 at the third connection line 60 according to FIG. 1 and is provided to the measurement port 28 via the fourth connection line 61. If no non-zero voltage level Um1 can be determined at the measurement port 18, it must be assumed that a fault is present, in which case the connection setup is aborted and an error message is output.

If a non-zero voltage level Um1 can be determined at test port 18, a check is made in a subsequent step to determine whether the determined voltage level Um1 corresponds at least essentially to the supply voltage Uv1, in particular whether it is identical to the supply voltage Uv1; this is represented by the equal sign. If the determined voltage level Um1 is not within a predetermined interval around the supply voltage Uv1, it must be assumed that a fault is present, in which case the connection setup is aborted and an error message is output. If the determined voltage level Um1 is within a predetermined interval around the supply voltage Uv1, it can be assumed that the sensor 2 is supplied with the desired supply voltage Uv1.

In a further step, a counter "x" is set to the value 0 and in a subsequent step the amount 1 is added to the counter "x", so that its amount is now 1. Subsequently, using the counter "n" and the counter "x", a communication protocol KP11 to be provided by the processor 5 at the output terminal 25 is provided in accordance with the amount 1 of the counter "n" and the amount 1 of the counter "x".

If a sensor signal Ue11 of the sensor 2 can be received at the input port 16 of the processor 5 with the now provided supply voltage Uv1 and the communication protocol KP11, the communication link with the sensor 2 has been successfully established and the sequence for establishing the communication link according to FIG. 2 can be exited while maintaining the supply voltage Uv1 and the communication protocol KP11.

If, on the other hand, no sensor signal is received from sensor 2, a subsequent step checks whether the counter "x" for the communication protocol within the first communication protocol sequence has already reached a specified maximum value "y" or whether this is not the case. If this is not the case, the amount of the counter "x" is increased again by 1 and accordingly the next communication protocol KP12 within the first communication protocol sequence is provided to the sensor 2.

If, on the other hand, the maximum value "y" has been reached, a subsequent step checks whether the counter "n" for the number of communication cycles to be provided by the processor has already reached a predetermined maximum value "z" or whether this is not the case. If this is not the case, the amount of the counter "n" is increased by 1 and accordingly a new, for example a second, communication cycle is started with a higher control voltage U2. If, on the other hand, the maximum value "z" is reached, the communication setup is aborted and an error message is output.

Figure 3:
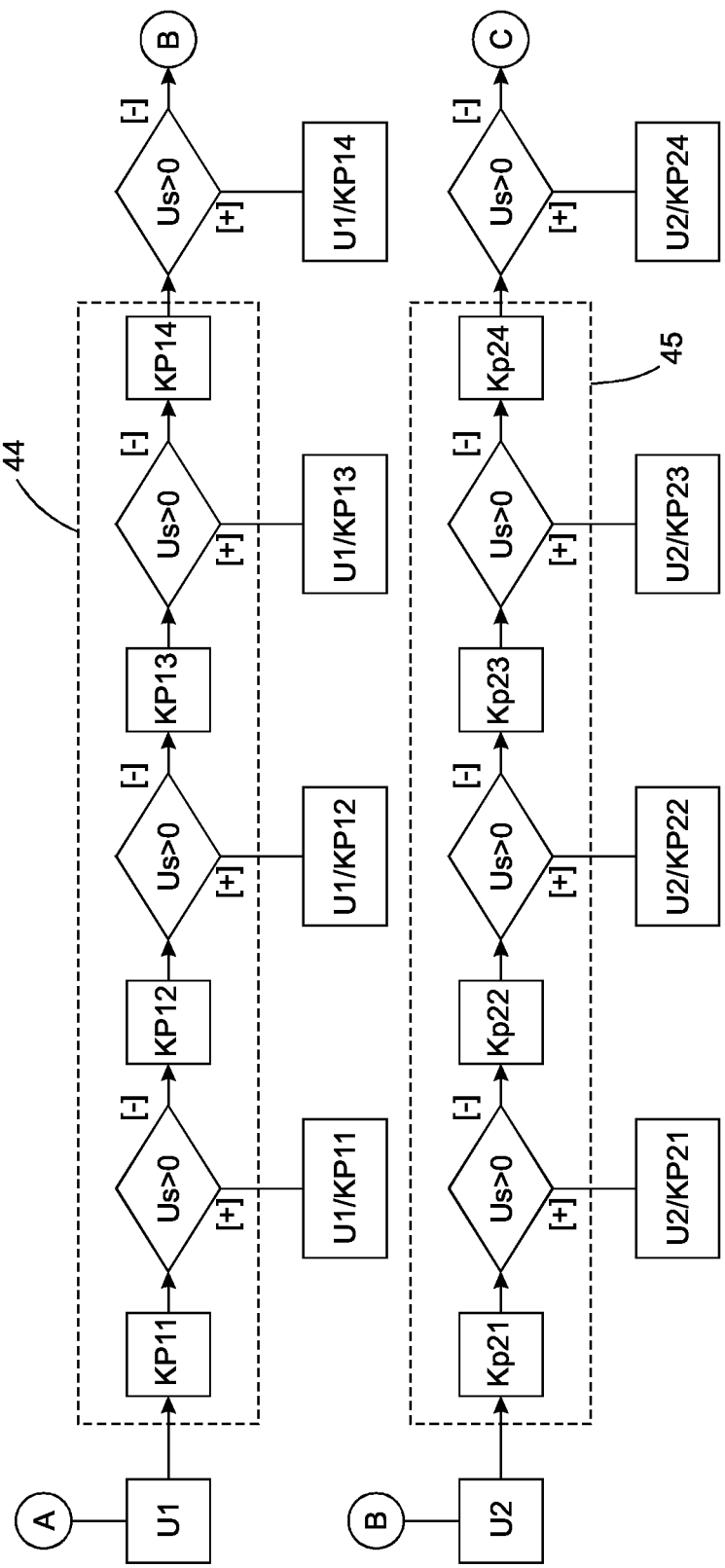

In the illustration of FIG. 3, two communication cycles 44, 45 are shown, whereby both communication cycles 44, 45 each have a communication protocol sequence which comprises four communication protocols KP11 to KP14 or KP21 to KP24, respectively. In practice, the different communication cycles may also comprise different numbers of communication protocols. Furthermore, the case may arise where a particular communication protocol is included both a first communication cycle and a second communication cycle. Furthermore, more than two communication cycles may be provided, possibly also with intersection sets with respect to at least part of the communication protocols.

FIG. 3 shows for each of the two communication cycles 44 and 45 the inner repetition loop of FIG. 2, in which the counter "x" is incremented by the amount 1 whenever no sensor signal could be determined and whenever, in addition, the predetermined maximum value "y" has not yet been reached. Furthermore FIG. 3 shows the outer repetition loop of FIG. 2, in which the counter "n" is always increased by the amount 1 when the counter "x" has reached the predetermined maximum value "y" and accordingly the respective communication cycle 44, 45 has ended. Here, it can be seen from FIG. 3 in connection with the first communication cycle 44 that, in the event that no sensor signal could be determined, the target point "B" is reached and that this target point "B" corresponds to the starting point "B" for the second communication cycle 45, which is subsequently run through and which, if necessary, can transition to a further communication cycle (not shown) at the target point "C".

What is claimed is:

1. A control for use in an automation system, the control comprising:
    a processor having a communication port for a communication with a sensor and for a reception of sensor signals and further having a control port for providing control signals; and
    a supply which is connected to the control port to provide a variable electrical supply voltage at a supply port as a function of a control signal level of the control signal,
    wherein the communication port and the supply port are connected to an interface which is configured for electrical connection to a sensor, and
    wherein the processor is configured for providing at least two different communication protocols at the communication port and for providing at least two different control signal levels at the control port.

2. The control according to claim 1, wherein the processor comprises a power output and wherein an electrical output stage is connected to the power output and to the interface, which electrical output stage provides electrical energy to the interface as a function of a power signal at the power output.

3. The control according to claim 2, wherein a sensor is connected to the interface, which sensor is configured for a communication with the processor according to a predetermined communication protocol and at a predetermined electrical supply voltage, and wherein an electrical consumer is connected to the interface, which electrical consumer is connected to the electrical output stage, the sensor being configured for detecting a physical variable of the electrical consumer and the electrical consumer being configured for providing a movement.

4. The control according to claim 1, wherein the processor is configured to terminate the execution of the respective communication cycle if a sensor signal arrives at the communication port and is further configured to maintain the communication protocol and the control signal level with which the sensor signal was triggered.

5. The control according to claim 4, wherein the processor is adapted for providing a read signal to the communication port for reading information from an electronic nameplate of the sensor and for adapting a processing of the sensor signals in dependence on the information read from the electronic nameplate.

6. The control according to claim 4, wherein the processor carries out a control algorithm with which the power signal can be varied as a function of the sensor signal or as a function of the sensor signal and a power demand.

7. The control according to claim 1, wherein the processor has a measurement port which is connected to the interface, and wherein the processor is configured to evaluate a measurement signal level which is provided at the measurement port.

8. A control for use in an automation system, the control comprising:
    a processor having a communication port for a communication with a sensor and for a reception of sensor signals and further having a control port for providing control signals; and
    a supply which is connected to the control port to provide a variable electrical supply voltage at a supply port as a function of a control signal level of the control signal, wherein the communication port and the supply port are connected to an interface which is configured for electrical connection to a sensor, and wherein the processor is configured for providing at least two different communication protocols at the communication port and for providing at least two different control signal levels at the control port, and wherein the processor is configured for a communication setup with a sensor for a sequential execution of a first communication cycle and a second communication cycle, wherein the first communication cycle comprises provision of a first communication protocol sequence at a first control signal level, wherein the second communication cycle comprises provision of a second communication protocol sequence at a second control signal level, and wherein the supply voltage of the second control signal level is higher than the supply of the first control signal level.

9. A method for establishing communication between a processor and a sensor, which form a control, wherein the processor processes sensor signals from the sensor and wherein the sensor which is connected to the processor senses a physical variable and provides a sensor signal which is dependent on the sensed physical variable, wherein the sensor communicates with the processor according to a predetermined communication protocol upon provision of a predetermined supply voltage from the processor, the method comprising:

sequentially performing a first communication cycle and a second communication cycle, wherein the first communication cycle comprises providing a first communication protocol sequence at a first control signal level, and the second communication cycle comprises providing a second communication protocol sequence at a second control signal level, and wherein the supply voltage is higher when the second control signal level is provided than when the first control signal level is provided, and wherein termination of the respective communication cycle occurs as soon as a sensor signal is provided by the sensor.

10. The method according to claim 9, wherein, in the first communication protocol sequence, a plurality of communication protocols are provided which are configured for communication with the sensor when a first electrical supply voltage is present, and wherein, in the second communication protocol sequence, a plurality of communication protocols are provided, which are configured for communication with the sensor when a second electrical supply voltage is present.

* * * * *